United States Patent [19]

Servati

[11] Patent Number: 5,404,856
[45] Date of Patent: Apr. 11, 1995

[54] FUEL INJECTOR CONTROL UTILIZING FUEL FILM FLOW PARAMETERS

[75] Inventor: Hamid B. Servati, Farmington Hills, Mich.

[73] Assignee: Ford Motor Company, Dearborn, Mich.

[21] Appl. No.: 103,378

[22] Filed: Aug. 9, 1993

Related U.S. Application Data

[63] Continuation-in-part of Ser. No. 82,565, Jun. 28, 1993.

[51] Int. Cl.$^6$ ............................................ F02M 51/00
[52] U.S. Cl. ...................................................... 123/478
[58] Field of Search ............... 123/478, 684, 492, 493, 123/480, 682; 364/431.08

[56] References Cited

U.S. PATENT DOCUMENTS

| | | | |
|---|---|---|---|
| 5,190,020 | 3/1993 | Cho | 123/684 |
| 5,215,061 | 6/1993 | Ogawa et al. | 123/478 |
| 5,257,607 | 11/1993 | Gillespie | 123/478 |
| 5,263,455 | 11/1993 | Iwai et al. | 123/478 |
| 5,278,762 | 1/1994 | Kawamura | 364/431.08 |

OTHER PUBLICATIONS

"Spray/Wall Interactions Simulation", by H. Servati et al., SAE Technical Paper #890566, International Congress and Exposition, Detroit, Mich., Feb. 27–Mar. 3, 1989, 9 pgs.

*Primary Examiner*—Raymond A. Nelli
*Attorney, Agent, or Firm*—Roger L. May; Peter Abolins

[57] ABSTRACT

A fuel injection control system for an internal combustion engine which compensates for intake port and intake valve wall wetting is disclosed. The system compensates for fuel film flow on the wall to maintain a substantially constant air/fuel ratio during acceleration and deceleration. Physical characteristics of the air and fuel used in engine combustion, intake manifold pressure, and engine speed are processed by the engine control to control the amount of fuel injected by the fuel injector with a compensation for unvaporized fuel on intake port surfaces.

1 Claim, 2 Drawing Sheets

FUEL INJECTOR CONTROL UTILIZING FUEL FILM FLOW PARAMETERS

CROSS REFERENCE TO RELATED APPLICATION

This application is a continuation-in-part of my prior U.S. patent application entitled "Fuel Injector Control Incorporating Fuel Vaporization Parameters", Ser. No. 08/082,565, filed Jun. 28, 1993.

TECHNICAL FIELD

The present invention relates to fuel injector controls for internal combustion engines and, more particularly, to a fuel injector control that optimizes the quantity of fuel supplied.

BACKGROUND OF INVENTION

Internal combustion engines are fueled by an air-fuel mixture combusted in cylinders. Control of the air-fuel mixture ratio is important in optimizing the performance of an internal combustion engine and resultant exhaust gas emissions.

Prior injector controls are designed to provide precise control of the air-fuel mixture in steady state operations. The optimum air-fuel mixture ratio is normally about 14.6:1. Under transient conditions; e.g., during acceleration or deceleration, the air-fuel ratio can change from the optimum ratio, which is referred to as running lean or rich, for a time on the order of one second or more. Factors such as engine temperature, manifold pressures, fuel vapor pressure and engine air mass flow rates affect the degree to which air-fuel ratios deviate from ideal conditions.

Fuel injectors generally direct fuel sprayed by a nozzle onto a wall of an intake port or valve surface. Fuel supplied as a spray on the wall of an intake port either vaporizes or coats the wall of the intake port as a liquid or film which wets the wall. A portion of the fuel wetting the walls of the intake port and valve creates a liquid film which flows on the walls. Liquid fuel film flows at a slower speed than the inducted air and fuel vapor. Some of the liquid fuel film evaporates as it flows in the walls.

Under ideal circumstances, all of the fuel supplied is in the form of a vapor. However, on initial start up or during rapid acceleration, relatively cool temperatures of intake port wall or rapid increase in fuel supplied prior to increasing engine speed results in the formation of a sizeable deposit of liquid fuel film on the intake port wall.

Applicant's technical paper entitled "Spray/Wall Interactions Simulation", Servati, Hamid B. and Herman, Edward W., SOCIETY OF AUTOMOTIVE ENGINEERS, Paper No. 890566, explains injector spray wall interactions for the purpose of optimizing injector location, design and spray patterns for improving engine performance. As explained in that paper, two phenomena are considered in fuel vaporization: (i) conductive fuel vaporization; and (ii) convective fuel vaporization. Conductive vaporization is a function of fuel volatility wherein fuel contacting warm surfaces results in lower boiling point hydrocarbons evaporating while the high end hydrocarbons with low vapor pressure remain on the walls in liquid form. Convective vaporization results from turbulent forced convection of fuel into the air stream. Fuel properties, such as viscosity, density, diffusivity, fuel temperature and wall surface temperature, air flow, intake manifold pressure, charge temperature, engine speed and the area of the vaporization surface all affect convective fuel vaporization.

Fuel is transported into the engine cylinder in gaseous and liquid form, the liquid form being provided by the flow of a fuel film on the wall to the intake port.

While these engine operation conditions have been known, utilization of this information as a basis for an injector control system has not heretofore been developed.

SUMMARY OF INVENTION

The present invention comprises an apparatus for controlling a fuel injection system of an internal combustion engine based upon a determination of the convective fuel vapor mass and conductive fuel vaporization rate. The apparatus includes means for determining the following parameters: fuel vapor pressure, air charge temperature, engine air mass flow, fuel wetted area characteristic diameter, fuel wetted area characteristic length, manifold pressure, engine speed and puddle fuel temperature. The above parameters are processed by an engine control which receives signals representative of the above-identified factors and calculates the convective fuel vapor flow mass and conductive fuel vaporization rate. The amount of fuel injected to the engine is controlled to compensate for fuel resident on the walls of the intake port or valve, a portion of which is subsequently vaporized and mixed with air during injection cycles.

The present invention also relates to an apparatus for controlling a fuel injection system of an internal combustion engine in which fuel is injected into an intake manifold by the fuel injector. The apparatus comprises means for determining the physical characteristics of air used in engine combustion. The apparatus further comprises means for determining the physical characteristics of fuel used in engine combustion and means for determining both the intake manifold pressure and the engine speed. Means are also provided for determining from the physical characteristics of the air and fuel used in engine combustion, the intake manifold pressure, engine speed and fuel film flow characteristics to generate a control signal used to control the amount of fuel injected to compensate for unvaporized fuel deposited on the walls of the intake manifold which flows as a film into an engine cylinder during the injection cycle.

According to the invention, the means for determining the physical characteristics of air used in engine combustion include means for determining the air charge temperature and generating the air charge temperature signal representative thereof and means for determining engine air mass flow and for generating an engine air mass flow signal representative thereof.

According to another aspect of the invention, the means for determining physical characteristics of fuel further includes means for determining the fuel wetted area and generating a fuel wetted area characteristic signal representative thereof. The means for determining the physical characteristics of the fuel further includes means for determining the puddle fuel temperature and generating a puddle fuel temperature signal representative thereof. The means for determining the physical characteristics of the fuel further includes means for determining fuel wetted and a puddle mass and generating a fuel wetted area puddle mass signal representative thereof.

According to another aspect of the invention, an apparatus for controlling a fuel injection system of an internal combustion engine is provided with the following elements:

a. means for determining and generating an air charge temperature signal;
b. means for determining and generating an engine air mass flow signal;
c. means for determining and generating a fuel wetted area characteristic signal;
d. means for determining and generating a manifold pressure signal;
e. means for determining and generating an engine speed signal;
f. means for determining and generating a puddle fuel temperature signal;
g. means for determining and generating a fuel wetted area puddle mass signal; and
h. an engine control unit which receives the above identified signals and generates a control signal based upon the signals to control the amount of fuel injected to compensate for unvaporized fuel that is deposited on intake component surfaces and flows as a film into an engine cylinder during injection cycles.

According to another aspect of the invention, a method for controlling a fuel injection system of an internal combustion engine includes determining air charge temperature, engine air mass flow, fuel wetted area, manifold pressure, engine speed, puddle fuel temperature and fuel wetted area puddle mass, and calculating from the above-identified signals a rate of fuel film flow according to the formula:

$$\frac{0.00342 * \left(\frac{L}{D}\right) * (64.885 + T_F) * AM * ACT * PM}{PMAN * N * NCYL}$$

where:
ACT = air charge temperature (in °R)
AM = engine air mass flow (in pounds per second)
D = fuel wetted area characteristic diameter (in feet)
L = fuel wetted area characteristic length (in feet)
PMAN = manifold pressure (in inches of Hg)
N = engine speed (in RPM),
$T_F$ = puddle fuel temperature (in °F.)
NYCL = number of engine cylinders
PM = fuel wetted area puddle mass Upon generating a control signal representative of the fuel film flow calculated, the amount of fuel injected into the engine is controlled to compensate for unvaporized fuel that is deposited on the walls of the intake manifold that flows as a film into the engine cylinder during injection cycles.

It is an object of the present invention to minimize or, ideally, the eliminate air/fuel ratio excursions during acceleration and deceleration.

It is another object of the present invention to utilize a wall wetting fuel compensation strategy to augment the closed/open fuel control to maintain a substantially constant air/fuel ratio during engine transients.

These and other objects of the present invention are achieved in accordance with the invention as will be more fully understood based upon a review of the drawings in view of the following detailed description of the best mode for carrying out the invention.

BEST MODE FOR CARRYING OUT THE INVENTION

Figure 1:
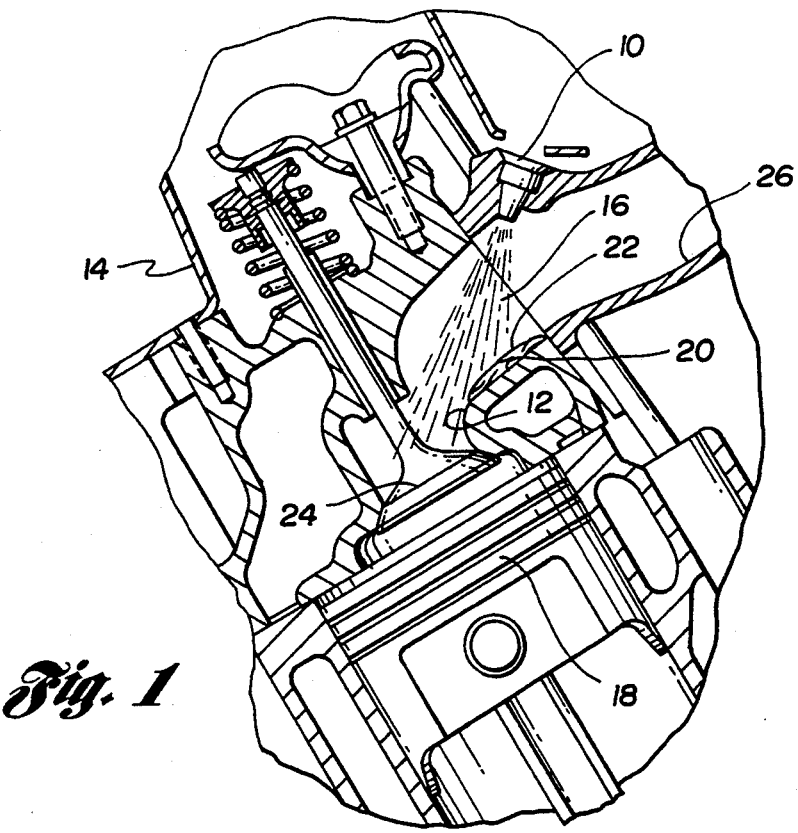
FIG. 1 is a fragmentary, cross-sectional view showing an injector delivering fuel to an intake port of a cylinder head.

Referring now to the drawings, FIG. 1 shows a fuel injector 10 and an intake port 12 of an internal combustion engine 14. The fuel injector is shown injecting fuel 16 in the area of the intake port 12 which is to be supplied to the cylinder 18 of the internal combustion engine 14. A portion of the fuel 16 is sprayed on a wall 20 where it forms a puddle 22 comprising the excess quantity of fuel 16 supplied by fuel injector 10 that is not vaporized. Fuel vapors in the fuel intake port 12 and the puddle 22 on the wall 20 are drawn toward the valve 24 during the engine cycle.

Fuel injector 10 is not a direct injection fuel injector but instead injects fuel into the intake port 12.

Figure 2:
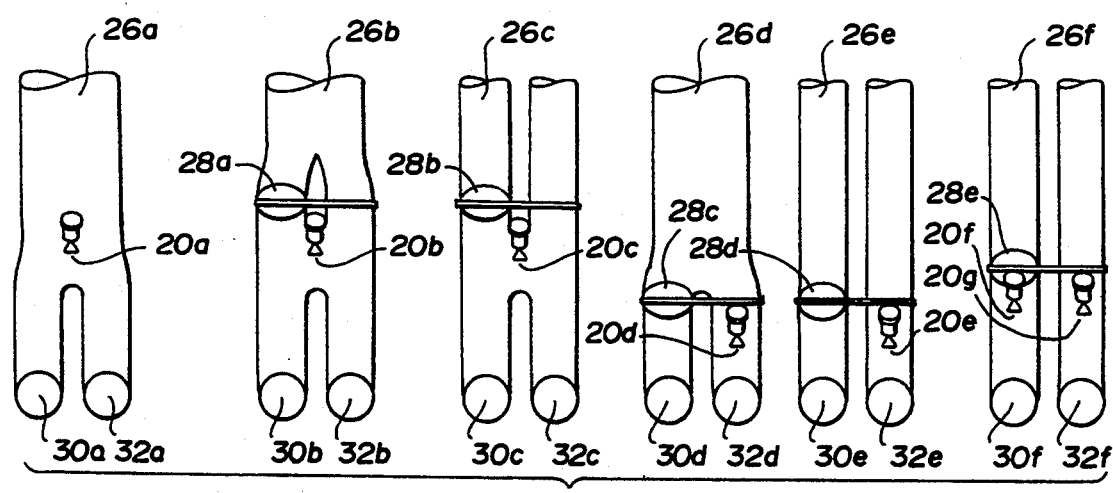
FIG. 2 is a schematic view of different intake port configurations for internal combustion engines.

Referring now to FIG. 2, six different intake manifolds 26 (a)-(f) are shown wherein one or more fuel injectors are positioned in various locations. A butterfly valve 28 (a)-(e) may be incorporated as part of the intake manifold assembly which is cycled to control air flow through the intake manifold 26. Fuel 16 supplied to walls 20 (a)-(f) in various locations on the intake manifolds 26 (a)-(f). Fuel 16 is supplied in the location shown and directed to intake walls 28 (a)-(f) to provide fuel to first and second intake ports 30 (a)-(f), 32 (a)-(f).

Depending upon the location of the fuel injector, its type and orientation, different characteristics of air and vapor flow can be projected. Likewise, flow of fuel in liquid or film form can be projected based upon the same factors. Other factors related to temperature, manifold pressure, air mass and fuel characteristics can be simulated and used to develop a fuel injector system which provides optimum air/fuel ratio mixtures under essentially all circumstances.

Figure 3:
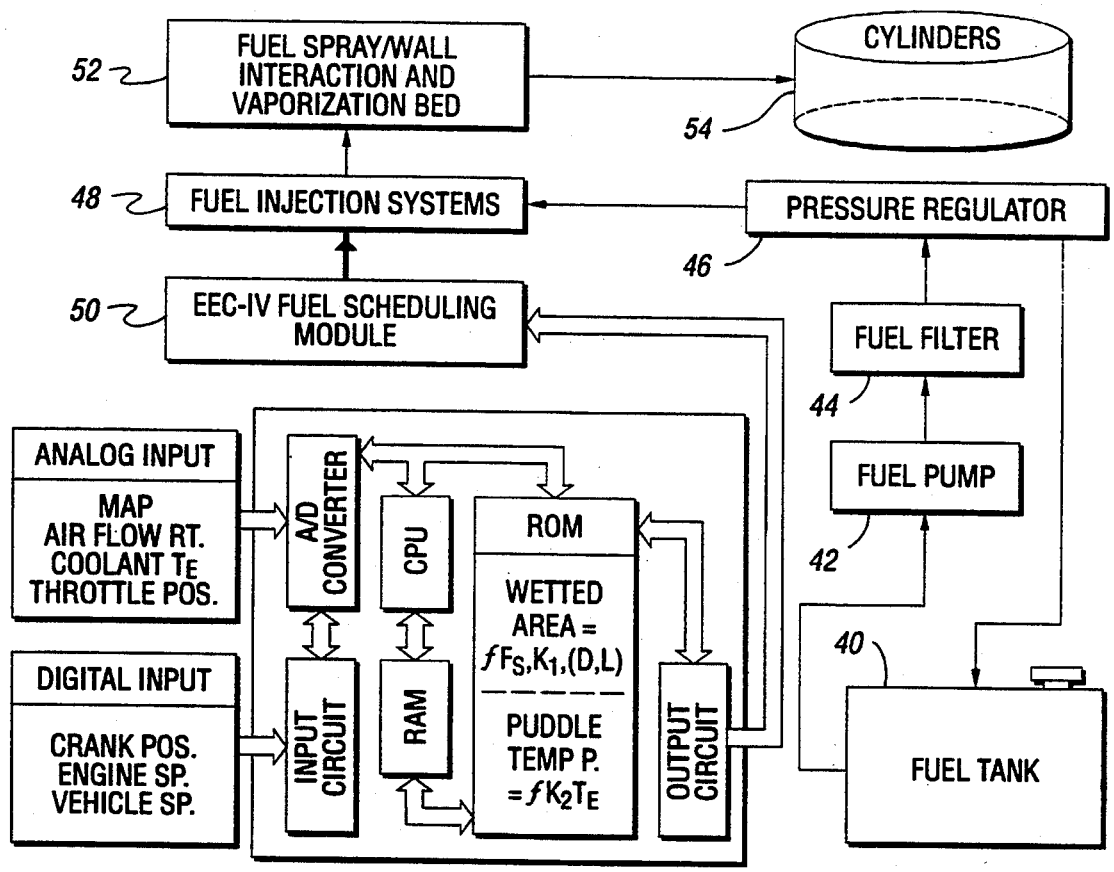
FIG. 3 is a flow chart showing a fuel path for an electronic fuel injection system.

Referring now to FIG. 3, a fuel system is shown schematically wherein fuel tank 40 provides fuel to a fuel pump 42. Fuel leaving the fuel pump 42 passes through a fuel filter 44 and into a pressure regulator 46. Fuel is supplied by the pressure regulator 46 to the fuel injection system 48. The fuel injection system 48 is controlled by an electronic control module known as EEC-IV fuel scheduling module 50. The fuel scheduling module 50 controls the timing of the fuel injection by the fuel injection system 48 so that the fuel spray/wall interaction in vaporization bed 52 is closely controlled.

According to the invention, the fuel injection system provides fuel to the fuel spray wall interaction and vaporization bed 52 so as to prevent lean air/fuel ratios during acceleration (especially at low temperatures). Lean air/fuel ratios are caused by supplying excessive amounts of fuel for a period of time which are not appropriately converted into fuel vapor but instead pass in liquid phase from the vaporization bed to the cylinders. Likewise, when decelerating, the fuel injection system is controlled by ECC-IV fuel scheduling module 50 so that the fuel puddle mass is minimized. Upon deceleration the fuel contained in the puddle is limited so that a lesser quantity of fuel is available in the puddle. This minimizes the quantity of unwanted fuel provided to engine after it is desired to reduce the supply of fuel to the engine.

Figure 4:
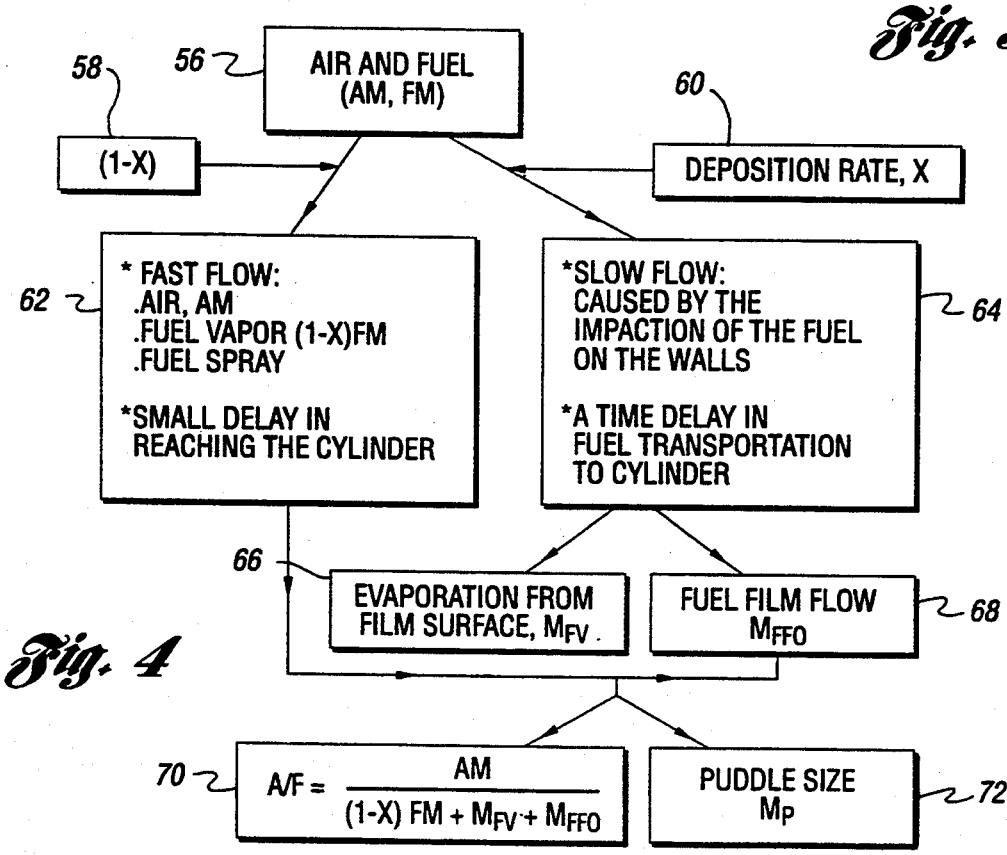
FIG. 4 is a flow chart showing the fuel path after injection in an electronic fuel injection system according to the present invention.

Operation of the algorithm by which the ECC-IV fuel scheduling module operates will be explained by reference to FIG. 4. The air and fuel supplied to the engine is referred to as air mass AM and fuel mass FM and diagrammatically shown at reference numeral 56 and FIG. 4. A first portion represented by reference numeral 58 represents the vaporized fuel supplied to the fuel/spray wall interaction and vaporization bed. A second portion of the fuel shown at reference numeral 60 is the liquid fuel deposited on the fuel spray/wall interaction and vaporization bed. The liquid portion of the fuel is primarily composed of the low volatility portion of the fuel. As shown at reference numeral 62, the vaporized fuel 58 flows quickly to the engine and is affected by the air mass, fuel vapor pressure and fuel spray. The vaporized fuel portion has only a small delay in reaching the cylinder. In contrast, the liquid fuel 60 as shown at reference numeral 64 exhibits primarily slow fuel film flow characteristics which is caused by the impaction of the liquid phase fuel on the walls on the intake manifold. A time delay (generally on the order of one to two seconds) may occur in the time required to transfer the fuel from the walls of the intake manifold to the engine cylinder.

Liquid fuel is transported in two ways to the cylinder. A portion of the liquid fuel deposited as shown at 66 evaporates from the surface of the film. This is generally characterized by the variable $M_{FV}$ which is representative of the mass of the fuel evaporation. The balance of the liquid fuel 60 is transmitted to the cylinder, as shown at reference numeral 68, as a fuel film flow represented in the control algorithm as $M_{FFO}$, which is representative of the mass of the fuel flowing as a film along the wall.

Referring to reference numeral 70, the general formula for air/fuel mixtures employed by the fuel scheduling module 50 is:

$$A/F = \frac{AM}{(1-X)FM + M_{FV} + M_{FFO}}$$

As shown at reference numeral 72, the puddle size $M_P$, which is representative of the mass of the puddle, is also developed by the algorithm.

The specific algorithm utilized by the apparatus for controlling a fuel injection system calculates convective fuel vapor flow mass according to the following formula:

$$\frac{(0.0050166 * VAP * \sqrt{ACT} * AM)}{(D * L * PMAN * N)}$$

where:
VAP=puddle fuel vapor pressure (in PSI)
ACT=air charge temperature (in °R)
AM=engine air mass flow (in pounds per second)
D=fuel wetted area characteristic diameter (in feet)
L=fuel wetted area characteristic length (in feet)
PMAN=manifold pressure (in inches of Hg)
N=engine speed (in RPM).

Also according to the present invention, the algorithm for calculating conductive fuel vaporization rate is as follows:

$$\dot{M}_F * VAPFAC$$

where:
$\dot{M}_F$=injected fuel flow mass rate
$T_F$=puddle fuel temperature (in °F.)
VAPFAC=0.002 for $T_F \leq 0$
VAPFAC=0.0021 * $T_F$ for $0 < T_F < 200$
VAPFAC=0.003625 * $T_F$ − 0.305 for $200 < T_F < 400$, The specific algorithm utilized by the apparatus for controlling a fuel injection system of the present invention calculates fuel film flow according to the following formula:

$$\frac{0.00342 * \left(\frac{L}{D}\right) * (64.885 + T_F) * AM * ACT * PM}{PMAN * N * NCYL}$$

where:
ACT=air charge temperature (in °R)
AM=engine air mass flow (in pounds per second)
D=fuel wetted area characteristic diameter (in feet)
L=fuel wetted area characteristic length (in feet)
PMAN=manifold pressure (in inches of Hg)
N=engine speed (in RPM),
$T_F$=puddle fuel temperature (in °F.)
NYCL=number of engine cylinders
PM=fuel wetted area puddle mass The means for determining the puddle fuel vapor pressure is a sensor disposed in the intake manifold. Alternatively, the puddle fuel vapor pressure can be simulated based upon other parameters including intake manifold design and fuel characteristics.

The means for determining the air charge temperature in generating an air charge temperature signal is a thermocouple disposed in the intake manifold.

The means for determining engine air mass flow and generating engine air mass flow signal is a mass air flow sensor, also known as a MAS sensor.

The means for determining the fuel wetted area characteristic diameter in generating a fuel wetted area characteristic diameter signal is calculated based upon fuel spray and wall interaction geometry characteristics for a given intake manifold design.

The means for determining the fuel wetted area characteristic length and generating a fuel wetted area characteristic length signal again is based upon fuel spray parameters $F_s$ and wall interaction geometry for the intake manifold. The latter is determined by empirical test data represented by constant $K_1$ in FIG. 3.

The means for determining the manifold pressure and generating a manifold pressure signal representative thereof is preferably a vacuum gauge. Alternatively, the manifold pressure can be inferred or measured by a capacitor-capsule MAP sensor.

The means for determining engine speed and generating an engine speed signal is a tachometer which measures the revolutions per minute of the engine.

The means for determining the puddle fuel temperature and generating a puddle fuel temperature signal is a calculated value based upon the engine coolant temperature $T_E$. Empirical test data, represented by constant $K_2$ in FIG. 3, can be determined for any given engine.

The engine control means is preferably the engine control unit or ECU. The ECU receives data representing the air charge temperature signal, the engine air mass flow signal, the fuel wetted area characteristic diameter signal, the fuel wetted area characteristic length signal, the manifold pressure signal, and the engine speed signal. The ECU then utilizes the above formula for calculating the fuel film flow according to the above formula. The ECU controls the amount of fuel injected to compensate for fuel deposited on intake component surfaces which is subsequently vaporized and mixed with air during injection cycles.

A detailed fuel strategy calculation with wall wetting compensation is attached as Appendix A.

It will be readily appreciated that the above description of the best mode of practicing the invention is presented by way of example and not by way of limitation. The spirit and broad scope of the applicant's invention should be construed by reference to the following claims.

FUEL STRATEGY, WALL WETTING FUEL COMPENSATION-CBABO PEDD-PTPE

OVERVIEW

The wall wetting fuel compensation strategy is a physical principles model of the delivery of fuel from the injector to the cylinder through: wall wetting and evaporation; wall and valve film flow; and the amount of fuel remaining in suspension. This model assumes that of any metered fuel delivered by the injector, some of the fuel will impinge on the wall of the manifold, some of the fuel will impinge on the back of the valve, and some of this impinged fuel will remain on these surfaces and flow into the cylinder as liquid fuel. Because there can be a sharp difference in temperature between the walls of the intake and the back of the valve, each of the surfaces' contribution to the manifold filling model are calculated separately.

DEFINITIONS

INPUTS

Registers:
- ACT=Air charge temperature.
- AM=Air mass flow, lb/min.
- AMPEM=Air mass flow for the engine, lb/min.
- CYL_AIR_CHG=Current cylinder air charge.
- CYLARC_BG=Air charge inducted per intake stroke, lb; value is updated once per background loop at the time that AM is computed.
- DT12S=The period in ticks between consecutive PIP low-to-high transitions; commonly referred to as the PIP period.
- ECT=Engine coolant temperature, deg F.
- F_A_RATIO1=Fuel:air ratio for EGO-1.
- F_A_RATIO2=Fuel:air ratio for EGO-2.
- ISCFLG=Register indicating the state of the idle speed control logic; 1→RPM control.
- LBMF_TABx=Eight registers contained within a table that display the fuel mass par injection for each individual cylinder; x=sequential cylinder number.
- OLDTP_WW=Throttle position on last pass through wall wetting strategy.
- PMA(n,x)=Puddle Mass Array=an array that contains the mass of fuel contained within the puddle as computed for the port (n=0) and for the valve (n=1) for the last (x=1 to ENGCYL) background computations.
- PUDL_MASS_P=Latest calculated mass of fuel contained within the puddle on the port walls.
- PUDL_MASS_V=Latest calculated mass of fuel contained within the puddle on the back of the valve.

FUEL STRATEGY, WALL WETTING FUEL COMPENSATION-CBABO PEDD-PTPE

Bit Flags:
- WW_INT=A flag that indicates that the wall wetting model has been initialized.

Calibration Constants:
- BOP=Value to determine the area factor for the port.
- BOV=Value to determine the area factor for the valve.
- B1P=Value to determine the area factor for the port.
- B1V=Value to determine the area factor for the valve.
- C1MAP=Multiplier parameter used in the computation of the manifold pressure.
- C2MAP=Additive parameter used in the computation of the manifold pressure.
- DEGPIP=Number of degrees of rotation of the engine between PIP low-to-high transitions.
- DIA_PORT5=Diameter of the port to the fifth power.
- DIA_VALV5=Diameter of the valve to the fifth power.
- ENGCYL=Number of cylinders fired in an engine revolution.
- FN355(ECT)=Function used to determine the factor used in anticipation of valve pressure; Input is ECT.
- FN356(AMXS)=Function used to determine the total air mass to the power of 0.83 at the runner; Input is AMXS.
- FN358(pmsqd)=Function used to determine the square root of the puddle mass squared; Input is puddle mass squared, pmsqd.
- FN359(temper)=Function used to determine the conductive vaporization fraction of fuel injected; Input is either VALV_TEMP or ECT.
- LEN_PORT2=Length of port, squared.
- LEN_VALV2=Length of valve, squared.
- MAPLAF=Minimum pressure for Manifold Absolute Pressure.
- MAPMMM=The inverse of the difference between the maximum and minimum pressure for Manifold Absolute Pressure.
- MIN_THR_WW=Minimim amount of thottle change that will cause either the decel or accel multipliers to be used against WWFS.
- MWWFSA=Wall wetting fuel multiplier during acceleration conditions.
- MWWFSD=wall wetting fuel multiplier during deceleration conditions.

FUEL STRATEGY, WALL WETTING FUEL COMPENSATION-CBABO PEDD-PTPE

- NPMAVE=Number of puddle mass calculations that are averaged together to provide the wall wetting value.
- NUMCYL=The number of cylinder in the engine.

NUMEG0=The number of EGO sensors in the engine.
VMULP=Vaporization multiplier based on the length and diameter of the port.
VMULV=Vaporization multiplier based on the length and diameter of the valve.
XCLOSE=Portion of the fuel injected into the closed valve; 1.0→no fuel into the open valve, 0→all fuel into the cylinder.
XPORT=Portion of the fuel landing on the port (1-XPORT is the portion landing on the valve).

OUTPUTS

Registers:
AFACTP=Area factor of the port.
AFACTV=Area factor of the valve.
AMXS=Air mass in pounds per second for each runner.
AM83=Total air mass in pounds per second to the power of 0.83 at the runner.
CNDVFP=Conductive vaporization factor for the port.
CNDVFV=Conductive vaporization factor for the valve.
DELMAP=Difference between MAP are minumum MAP.
F_A_RATIO2=See above.
FUEL_MAS_ACT=Fuel mass actually delivered by the inectors.
FUEL_MAS_EXP=Fuel mass expected to produce complete combustion.
MAN_PRES=Computed manifold pressure.
MFFPO=Mass of fuel flow at the port at initialization, lb/sec.
MFFVO=Mass of fuel flow at the valve at initialization, lb/sec.
MFOUTP=Sum of convective mass and film flow mass for the port.
MFOUTV=Sum of convective mass and film flow mass for the valve.
OLDTP_WW=See above.

FUEL STRATEGY, WALL WETTING FUEL COMPENSATION-CBABO PEDD-PTPE

PMA(n,x)=See above.
DUDL_MASS P=See above.
PUDL_MASS V=See above.
SQRACT=The square root of the air charge temperature.
TFACT=Factor used in anticipation of valve temperature using ECT.
TFCFA0=Interim calculation value.
TFCFA1=Interim calculation value.
TFCFFP=Transient fuel compensation film flow at the port, lb.
TFCFFV=Transient fuel compensation film flow at the valve, lb.
TFCFVP=Port convective vaporization.
TFCFVV=Valve convective vaporization.
TFCF1=Interim calculation value.
TFCPEQ=Liquid fuel portion of the injected fuel on the wall before valve opening for the port.
TFCPEO=Initialization value for TFCPEQ.
TFCVEQ=Liquid full portion of the injected fuel on the wall before valve opening for the valve.
TFCVEO=Initialization value for TFCVEQ.
TIMFIL=Duration of one intake event.
VALV_TEMP=Computed valve temperature.
VAPP=Vapor pressure of the puddle at the port.
VAPV=Vapor pressure of the puddle at the valve.
WWFS=Fuel mass required by system to compensate for wall wetting.
WWFSP=Fuel mass required by system to compensate for wall wetting due to the port.
WWFSV=Full mass required by system to compensate for wall wetting to the valve.

Bit Flags:
WW_INT=See above.

FUEL STRATEGY, WALL WETTING FUEL COMPENSATION-CBABO PEDD-PTPE

---

FUEL STRATEGY, WALL WETTING FUEL COMPENSATION - CBABO PEDD-PTPE

PROCESS

STRATEGY MODULE: FUEL_WALL_WET_COM1

TRANSIENT FUEL DECISION

Transient fuel compensation is initialized the first time the engine enters idle speed RPM control. The initialization requires calculation of the puddle mass at the port and at the valve under steady state or equilibrium conditions. Following initialization, the transient fuel stratey is executed on every background loop.

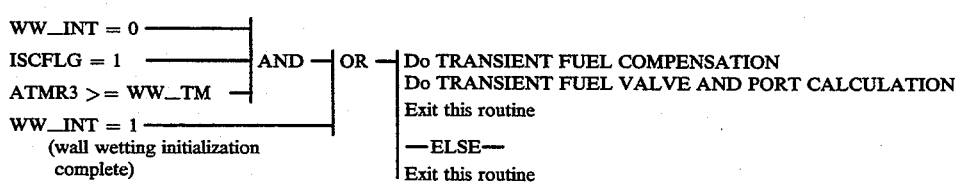

TRANSIENT FUEL COMPENSATION

Compute various base parameters on each background pass.

NUMEGO = 1 ──┤ F_A_RATIO2 = F_A_RATIO1

-continued
FUEL STRATEGY, WALL WETTING FUEL COMPENSATION - CBABO PEDD-PTPE always ──────── TIMFIL = (180 / DEGPIP) * (DT12S / [stcf])
FUEL_MAS_EXP = CYL_AIR_CHG * (F_A_RATIO1 + F_A_RATIO2) / 2]
AMXS = AMPEM / (30 * ENGCYL)
(runner air mass, lb/sec)

always ──────── AM83 = FN356(AMXS)

always ──────── TFACT = FN355(ECT)

always ──────── VALV_TEMP = ECT * (1 + TFACT)
(clip VALV_TEMP to a maximum of 360)

always ──────── MAN_PRES = C1MAP * CYLARC_BG * (AMPEM / AM) + C2MAP
(clip MAN_PRES to a maximum of 30)
DELMAP = MAN_PRES − MAPLAF
(clip DELMAP to a minimum of 0)
FUEL_MAS_ACT = (LBMF_TAB(1) + LBMF_TAB(2) + ... + LBMF_TAB(NUMCYL) / NUMCYL
(sum the actual fuel injected for all cylinders in last engine cycle and
then obtain the average by dividing by the total number of cylinders)
SQRACT(deg $R^{-2}$) = ACT * 0.02125 + 21.44
TFCF1 = AM83 / MAN_PRES
TFCFA0 = TFCF1 * (ACT + 460)
TFCFA1 = TFCF1 * SQRACT
n = 0

TRANSIENT FUEL VALVE AND PORT CALCULATION

The following calculations are repeated once for the port and again for the valve.

NOTE: Lower case names are non-displayable registers that are named
for ease of following the flow and values calculated within this routine.

n = 0 ──────── temper = ECT
xtemp = XPORT
b0par = 0.004
b0 = B0P
b1 = B1P
vm = VMULP
fm = 1.6722e-4 / (DIA_PORT5 * LEN_PORT2)
pm = PUDL_MASS_P

—ELSE— n = 1 ──────── temper = VALV_TEMP
xtemp = (1 − XPORT)
b0par = 0.0034
b0 = B0V
b1 = B1V
vm = VMULV
fm = 1.6722e-4 / (DIA_VALV5 * LEN_VALV2)
PM = PUDL_MASS_V always ──────── cndvf = FN359(temper)
(compute conductive vaporization fraction of fuel injected)

cndvf > 1.0 ──────── cndfv = 1.0 always ──────── mufrf = 64.885 + temper (fuel viscosity factor)
c0 = b0 + b0par * (b1 − b0) * temper
c1pc0 = (C1P − c0) * MAPMMM
afact = c0 + c1pc0 * DELMAP afact > 1.0 ──────── afact = 1.0 always ──────── vap = 1.715e-2 * temper + 2
(vapor pressure of fuel)
tfcfv = TFCFA1 * vm * vap * afact * TIMFIL
(convective vaporization)

FUEL STRATEGY, WALL WETTING FUEL COMPENSATION - CBABO PEDD-PTPE
-continued

```
WW_INT = 0 ─────────┐
                    ├─ AND ─┬─ Do TRANSIENT FUEL PUDDLE MASS AND PARAMETER INITIALIZATION
ISCFLG = 1  ────────┘       │  —ELSE—
                            │
WW_INT = 1  ────────────────┴─ Do PUDDLE MASS AND TRANSIENT COMPENSATION CALCULATION
```

TRANSIENT FUEL PUDDLE MASS AND PARAMETER INITIALIZATION always ─────────── temp = xtemp * FUEL_MAS_ACT * XCLOSE * (1 − cndvf)
                   → tfcfv > temp ───── tfcfv = temp
                   tfce0 = temp

—ELSE—
                   tfce0 = temp always ─────────── mff0 = (tfce0 − tfcfv) / TIMFIL (mass of fuel film)

mff0 <= 0  ─────── mff0 = 0
                   pm = 0

—ELSE—
                   pmsqd = (mff0 * afact) / (fm * mufrf * TFCFAO * AMXS)
                   pm = FN358(pmsqd)

Initialize the puddle mass array with the initial value of the puddle mass.

always ─────────── Do the following for x from 1 to NPMAVE
                   PMA(n, x) = pm n = 0  ─────────── TFCPE0 = tfce0
                   MFFP0 = mff0

—ELSE—
                   TFCVE0 = tfce0
N = 1  ─────────── N = 1
                   MFFV0 = mff0 n = 1  ─────────── WW_INT = 1
                   OLDTP_WW = TP

This is the end of the initialization.

always ─────────── Do PUDDLE MASS AND TRANSIENT COMPENSATION CALCULATION

PUDDLE MASS AND TRANSIENT COMPENSATION CALCULATION always ──────────────────────── temp = xtemp * FUEL_MAS_ACT * XCLOSE * (1 − cnavf)
                                (fuel mass added to puddle)

tfcfv > temp ────────────────── tfcfv = temp
                                tfceq = temp —ELSE—
                                tfceq = temp
                                (injected fuel mass less conductive vaporization)

always ──────────────────────── temp = fm * mufrf * TFCFAO * pm * pm * CYLARC_BG / afact
                                (film flow mass transfered to cylinder)

temp > pm ───────────────────── tfcff = pm

—ELSE—
                                tfcff = temp

-continued
FUEL STRATEGY, WALL WETTING FUEL COMPENSATION - CBABO PEDD-PTPE

| | |
|---|---|
| (tfcff + tfcfv) > (pm + tfceq)<br>[(film flow mass + convective vaporization) > (puddle mass + injected fuel − conductive vaporization)] | mfout + pm + tfceq<br>(fuel mass transfer from puddle to cylinder is all fuel in puddle and injection)<br>—ELSE—<br>mfout = tfcff + tfcfv<br>(fuel mass transfer = film flow mass + convective vaporization) |
| always | pm = pm + tfceq − mfout<br>(clip pm to a minimum of 0) |
| always | wwfx = xtemp * XCLOSE * FUEL_MAS_EXP * (1 − cndvf) − mfout<br>(transient compensation) |
| always | pmt = 0 |
| NPMAVE > 1 | Do the following for x from 1 to (NPMAVE − 1)<br>PMA(n, x) = PMA(n, x + 1)<br>pmt = pmt + PMA(n, x) |
| always | PMA(n, NPMAVE) = pm<br>pmt = pmt + pm<br>pm = pmt / NPMAVE |
| n = 0 | CNDVFP = cndvf<br>VAPP = vap<br>AFACTP = afact<br>TFCFVP = tfcfv<br>PUDL_MASS_P = pm<br>TFCPEQ = tfceq<br>TFCFFP = tfcff<br>MFOUTP = mfout<br>WWFSP = wwfx<br>n = 1<br>Return to: TRANSIENT FUEL VALVE AND PORT CALCULATION<br>—ELSE— |
| n = 1 | CNDVFV = cndvf<br>VAPV = vap<br>AFACTV = afact<br>TFCFVV = tfcfv<br>PUDL_MASS_V = pm<br>TFCVEQ = tfceq<br>MFOUTV = mfout<br>TFCFFV = tfcff<br>WWFSV = wwfx<br>End of duplicate code. Continue |
| (TP − OLDTP_WW) > MIN_THR_WW<br>TP − OLDTP_WW < 0    AND | WWFS = (WWFSP + WWFSV) * MWWFSD<br>OLDTP_WW = TP<br>—ELSE— |
| (TP − OLDTP_WW) > MIN_THR_WW | WWFS = (WWFSP + WWFSV) * MWWFSA<br>OLDTP_WW = TP<br>—ELSE—<br>WWFS = WWFSP + WWFSV<br>OLDTP_WW = TP |
| PMA(0, NPMAVE) <= 0<br>PMA(1, NPMAVE) <= 0    AND | WWFS = 0 |

FUEL STRATEGY, WALL WETTING FUEL COMPENSATION-CBABO PEDD-PTPE

I claim:

1. A method for controlling a fuel injection system of an internal combustion engine, the method comprising the steps of:

determining air charge temperature and generating an air charge temperature signal representative thereof;

determining engine air mass flow and generating an engine air mass flow signal representative thereof;

determining fuel wetted area and generating a fuel wetted area signal representative thereof;

determining manifold pressure and generating a manifold pressure signal representative thereof;

determining engine speed and generating an engine speed signal representative thereof;

determining puddle fuel temperature and generating a puddle fuel temperature signal representative thereof;

determining fuel wetted area puddle mass and generating a fuel wetted area puddle mass signal representative thereof;

calculating, from data represented by the air charge temperature signal, the engine air mass flow signal, the fuel wetted area signal, the manifold pressure signal, the engine speed signal, the puddle fuel temperature signal, and the fuel wetted area puddle mass signal, fuel film flow according to the following formula:

$$\frac{0.00342 * \left(\frac{L}{D}\right) * (64.885 + T_F) * AM * ACT * PM}{PMAN * N * NCYL}$$

where:
   ACT = air charge temperature (in °R)
   AM = engine air mass flow (in pounds per second)
   D = fuel wetted area characteristic diameter (in feet)
   L = fuel wetted area characteristic length (in feet)
   PMAN = manifold pressure (in inches of Hg)
   N = engine speed (in RPM),
   $T_F$ = puddle fuel temperature (in °F.)
   NYCL = number of engine cylinders
   PM = fuel wetted area puddle mass generating a control signal representative of the fuel film flow; and controlling, in response to the fuel film flow signal, the amount of fuel injected to compensate for unvaporized fuel that is deposited on an intake component surface that flows as a film into an engine cylinder during injection cycles.

* * * * *